No. 700,865. Patented May 27, 1902.
S. WELTER & J. ARMSTRONG.
CUTTING TOOL.
(Application filed Oct. 1, 1901.)
(No Model.)
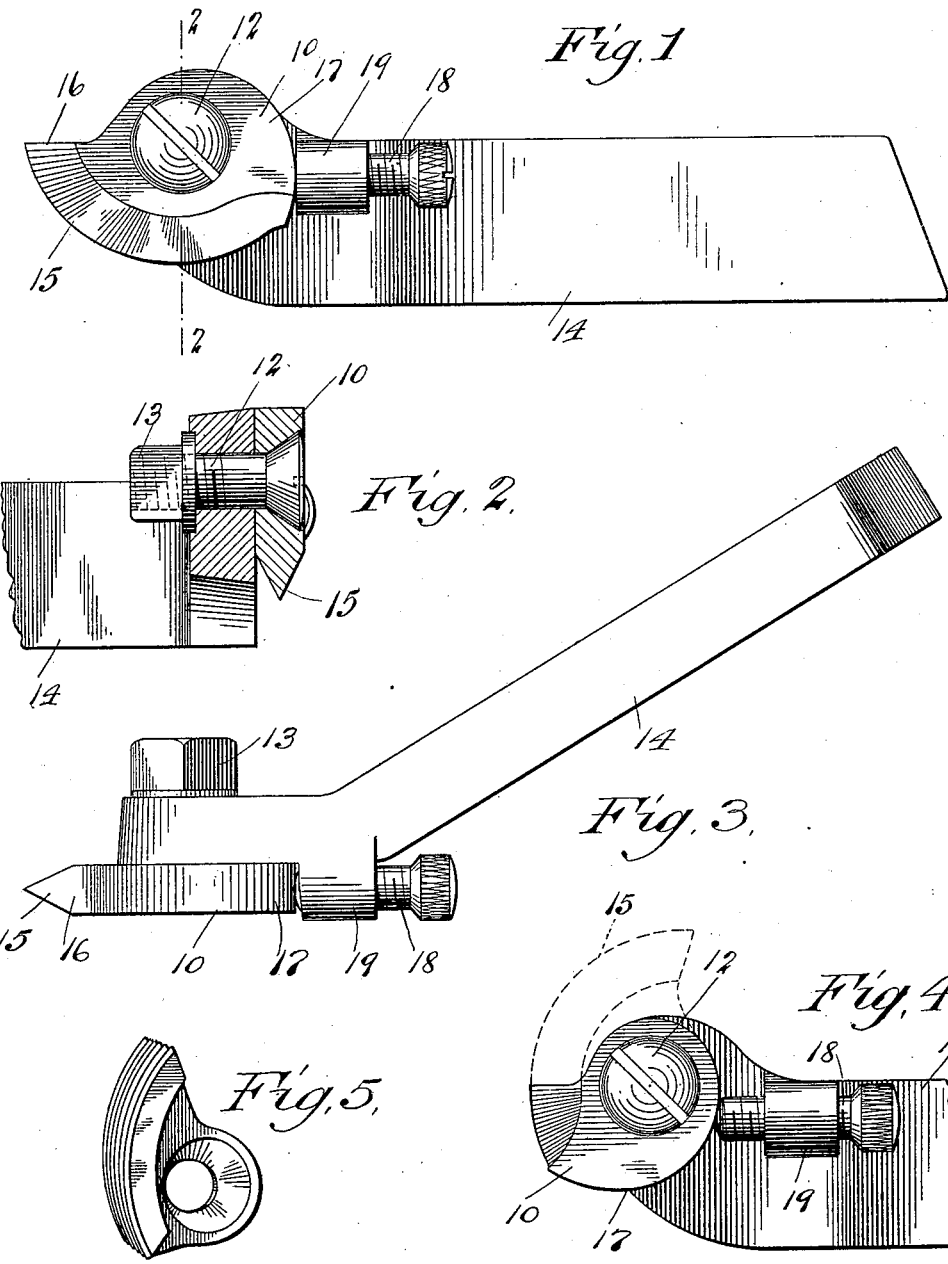
Witnesses:
Watson Hurlburt.
Arthur Seibel.
Inventors:
Samuel Welter
John Armstrong
By Louis K. Gillson Atty.

UNITED STATES PATENT OFFICE.

SAMUEL WELTER AND JOHN ARMSTRONG, OF CHICAGO, ILLINOIS, ASSIGNORS TO ARMSTRONG BROS. TOOL CO., A CORPORATION OF ILLINOIS.

CUTTING-TOOL.

SPECIFICATION forming part of Letters Patent No. 700,865, dated May 27, 1902.

Application filed October 1, 1901. Serial No. 77,208. (No model.)

*To all whom it may concern:*

Be it known that we, SAMUEL WELTER and JOHN ARMSTRONG, citizens of the United States, and residents of Chicago, county of Cook, and State of Illinois, have invented certain new and useful Improvements in Cutting-Tools, of which the following is a specification and which are illustrated in the accompanying drawings, forming a part thereof.

Our invention relates to tools for screw-cutting machines, lathes, and similar metal and wood forming machines, and has for its object to provide a pivoted or rotatable cutter which shall be simple in construction, efficient in operation, and capable of long use.

A further object of the invention is to provide a holder for the said cutter and means for securely holding the latter in its adjusted positions and against pivotal or rotary movement and for obtaining a nice and accurate adjustment of the tool with relation to its work.

The invention consists of a cutter having a thread or blade extending partially around the edge thereof and which commences at a radial cutting-face of the tool and describes an involute curve or a curve eccentric to the axis of the cutter.

The invention further consists of a pivoted or rotatable cutter having a cam-face or eccentric edge opposite to the cutting edge thereof and which is designed to coact with suitable holding means to hold the cutter in its adjusted positions and against movement.

The nature and scope of the invention will be more fully understood from the following description, taken in connection with the accompanying drawings, in which—

Figure 1 is a side elevation of the cutting-tool and the holder employed therewith. Fig. 2 is a section on the line 2 2 of Fig. 1, the screw and nut for securing the cutter to the holder being shown in dotted lines. Fig. 3 is a plan of the cutter and holder. Fig. 4 shows an old or worn cutter and the manner of its adjustment on the holder, and Fig. 5 illustrates a modification of the cutting-tool.

The cutter 10 may take the form of a double involute cam, each cam preferably extending approximately through one hundred and eighty degrees, not necessarily or desirably of the same curvature, and the maximum radius of one cam form may, if desired, be substantially identical with the minimum radius of the other, in which case the cutter would be more accurately described as in the form of a single snail-cam. One of these cam forms 15 commences with a flat face 16, preferably radial as to the axis of the cutter, and its perimiter is brought to an edge conforming to the shape of the groove to be cut. As shown, it is V-shaped. The other cam form 17 extends from the base of the cam 16 and its perimeter is flat. Upon its axis the cutter is provided with a countersunk aperture to receive a bolt 12, by which and the nut 13 it may be secured to the holder 14. The holder 14 is bent at a point slightly farther from the aperture for the bolt 12 than the maximum diameter of the cam form 17, so that its body portion is oblique to the axis of this bolt and inclined away from the face to which the cutter is applied. At the angle of the holder there projects an integral apertured boss 19, through which is set a threaded bolt 18, the end of which bears upon the perimeter of the cam form 17.

In use the cutter is adjusted so that the cutting-point or nose, being the outer end of the cam form 15, is in the desired angular position with reference to the work, and this may readily be accomplished by turning down the bolt 18 so as to just bear upon the perimeter of the cam form 17. The desired adjustment having been secured and the bolt 18 bearing against the cam form 17, the nut 13 is turned down tightly. The cutter may be securely held in place by the nut 13; but it is supplemented by the bolt 18, which serves as a positive stop, resisting the pressure upon the cutting-point. The cam form 17 provides means for securing a fine angular adjustment of the cutter and as the latter is worn away by service admits of its continued use at any desired adjustment, as indicated in Fig. 4, where a cutter is shown in which the cutting edge has been nearly all ground away. The involute or receding curve of the cam form 15 provides clearance for the work immediately back of the cutting-point, and this is true whether the tool be new or to whatever degree it may have been worn away.

It will be obvious that any other holding means capable of performing the functions of the screw 18 may be substituted therefor; also, that the cutter may be provided with any form of cutting point or edge, such as that of the chaser type, which is illustrated in Fig. 5.

We claim as our invention—

1. A thread-cutter having a curved and beveled edge of uniform angle, a pivot to which such edge is eccentric and being located between the cutting edge and the center of the circle of which such edge is an arc, and a cutting-face radial to the pivot.

2. A thread-cutter having a pivot-aperture, and a cutting-face and a bearing-face relatively on opposite sides of such aperture, the periphery of the cutter extending back from the cutting-face on an arc struck from a center more remote than the pivot-aperture and the bearing-face extending in the opposite direction from the cutting-face approximately on a convolute curve relatively as to the pivot-aperture.

3. In a thread-cutting tool, in combination, a stock, a cutter pivotally secured to the stock and having a cutting-face radial to the pivot, a portion of the periphery of the cutter being the cutting edge and extending backwardly from the cutting-face and a portion of the periphery of the cutter being a bearing-face, such two portions being on opposite sides of the pivot and eccentric thereto, the said pivot being located between the cutting edge and the center of the circle of which such edge is an arc and the bearing-surface gradually approaching the pivot from its end nearest the rearward end of the cutting edge, and an adjustable member carried by the stock and engaging the bearing-face.

4. A thread-cutting tool provided with a pivot-aperture and a cutting-face radial to the pivot-aperture, a portion of the periphery of the tool being a cutting edge and a portion thereof being a bearing-surface, both of such peripheral portions being eccentric to the pivot-aperture and the line of the cutting edge extending from the cutting-face and gradually approaching the pivot-aperture as it recedes from the cutting-face.

SAMUEL WELTER.
JOHN ARMSTRONG.

Witnesses:
FRANK J. WAINDL,
A. B. JOHNSON.